United States Patent
Ju et al.

(10) Patent No.: US 7,774,307 B2
(45) Date of Patent: Aug. 10, 2010

(54) METHOD AND APPARATUS FOR SYNCHRONIZING A DATABASE WITH A THIRD PARTY DATABASE

(75) Inventors: Wade Ju, Cupertino, CA (US); Yi Yang, San Mateo, CA (US); Zeljko Zuljevic, Sunnyvale, CA (US); Antonius A. Wiryawan, San Ramon, CA (US)

(73) Assignee: Siebel Systems, Inc., San Mateo, CA (US)

( * ) Notice: Subject to any disclaimer, the term of this patent is extended or adjusted under 35 U.S.C. 154(b) by 460 days.

(21) Appl. No.: 10/206,263

(22) Filed: Jul. 23, 2002

(65) Prior Publication Data

US 2007/0239796 A1    Oct. 11, 2007

Related U.S. Application Data

(60) Provisional application No. 60/307,646, filed on Jul. 24, 2001.

(51) Int. Cl.
G06F 7/14 (2006.01)
(52) U.S. Cl. ...................... 707/616; 707/641
(58) Field of Classification Search ............... 707/1–10, 707/200–206
See application file for complete search history.

(56) References Cited

U.S. PATENT DOCUMENTS

| | | | |
|---|---|---|---|
| 5,640,566 A | 6/1997 | Victor et al. | |
| 5,857,201 A | 1/1999 | Wright, Jr. et al. | |
| 5,867,688 A | 2/1999 | Simmon et al. | |
| 5,870,765 A * | 2/1999 | Bauer et al. | 707/203 |
| 5,991,771 A | 11/1999 | Falls et al. | |
| 6,205,448 B1 | 3/2001 | Kruglikov et al. | |
| 6,269,369 B1 | 7/2001 | Robertson | |
| 6,493,727 B1 * | 12/2002 | Huang et al. | 707/201 |

* cited by examiner

*Primary Examiner*—Charles Rones
*Assistant Examiner*—Mellissa M Chojnacki
(74) *Attorney, Agent, or Firm*—Campbell Stephenson LLP

(57) ABSTRACT

In one embodiment, the present invention is a method of changing information in a first database and a second database. The method includes receiving new information. The method also includes receiving a first record from the first database, the first record corresponding to the new information. The method further includes receiving a second record from the second database, the second record corresponding to the new information. The method also includes merging the new information, the first record, and the second record into a final record.

25 Claims, 9 Drawing Sheets

METHOD AND APPARATUS FOR SYNCHRONIZING A DATABASE WITH A THIRD PARTY DATABASE

CLAIM FOR DOMESTIC PRIORITY

This application claims priority to provisional application Ser. No. 60/307,646, filed on Jul. 24, 2001.

BACKGROUND OF THE INVENTION

1. Field of the Invention

The invention relates generally to database processing and more specifically to transactions between multiple databases.

2. Description of the Related Art

Updating data within a single database is a well-known field. However, maintaining coherent data within multiple databases requires additional effort. When two databases share data, changes in one database may affect data in the other database. Moreover, when one database has multiple channels for changes, the other database may lose coherency with data in the first database. For example, when a first database is long established, and it would be useful to share data on a continuous basis with a second database, it may be tough to maintain coherency between the two databases. Therefore, finding a way to maintain coherency between a main database and a third-party database may be useful.

BRIEF DESCRIPTION OF THE DRAWINGS

The present invention is illustrated by way of example and not limitation in the accompanying figures.

DETAILED DESCRIPTION

Figure 1:
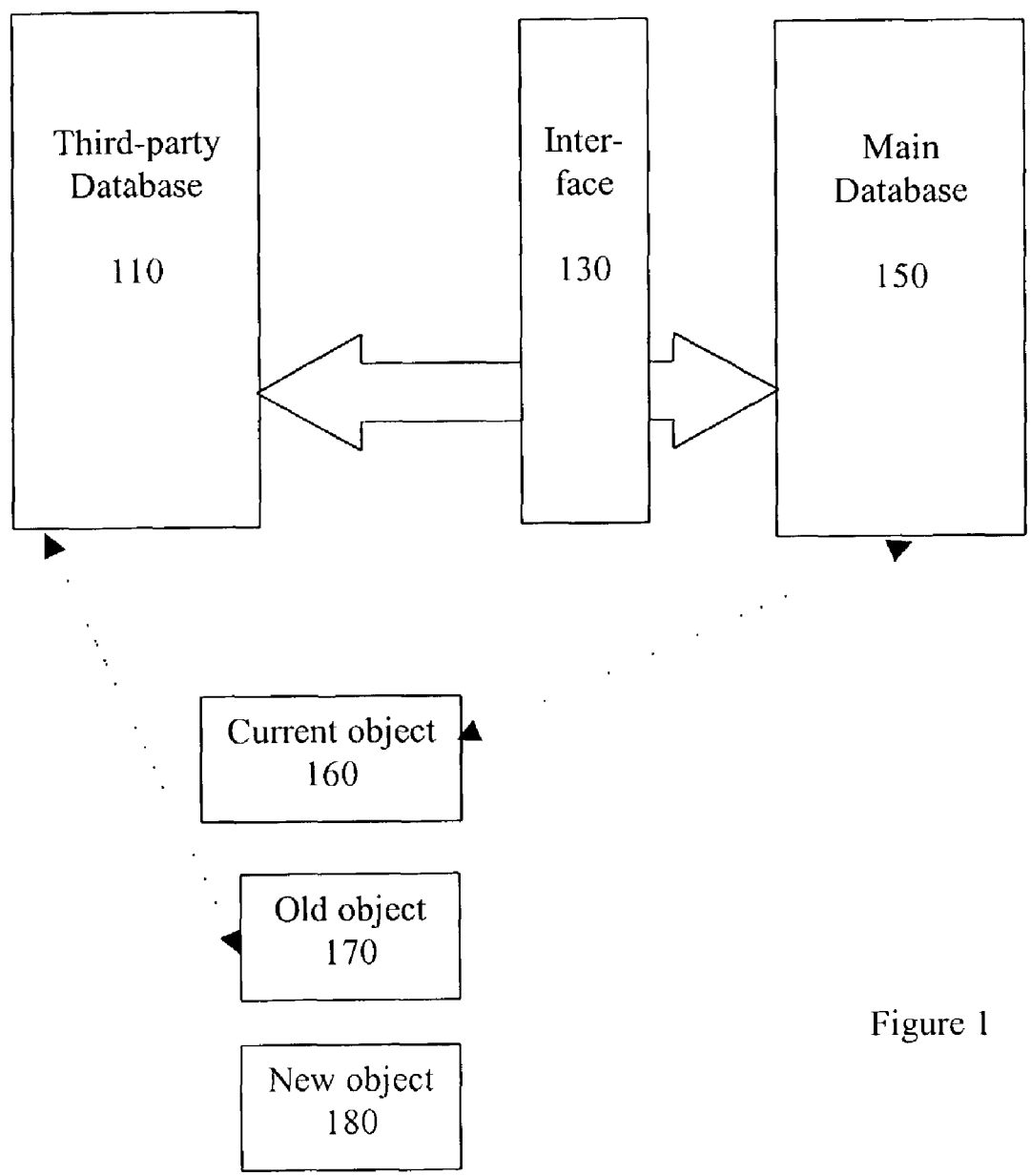
FIG. 1 illustrates an embodiment of a system.

A method and apparatus for synchronizing a database with a third party database is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

In one embodiment, the present invention is a method of changing information in a first database and a second database. The method includes receiving new information. The method also includes receiving a first record from the first database, the first record corresponding to the new information. The method further includes receiving a second record from the second database, the second record corresponding to the new information. The method also includes merging the new information, the first record, and the second record into a final record.

In an alternate embodiment, the invention is an apparatus. The apparatus includes a receiver module to receive new information, receive a first record from a first database, the first record corresponding to the new information, and to receive a second record from a second database, the second record corresponding to the new information. The apparatus also includes a merge module to merge the new information, the first record, and the second record into a final record, the merge module coupled to the receiver module. The apparatus may further include an update module to update the first record in the first database using the contents of the final record, and to update the second record in the second database using the contents of the final record, the update module coupled to the merge module. The apparatus may also include a lock module to lock and unlock the first record of the first database, the lock module coupled to the receiver module and the update module. The apparatus may further include a verification module to verify the changes to the second record in the second database.

In another embodiment, a method of handling changes in a main database-third-party database system is presented. The method includes receiving a change in data in the third-party database. The method also includes obtaining the old data from the main database and from the third-party database. The method also includes merging the changed data with old data from the main database and old data from the third-party database. The method may further include updating the main database and updating the third-party database. The method may also further include utilizing a locking protocol with one or both of the main database and the third-party database, and using a communications protocol between the two databases. The method may also include use of an interface with the main database.

In an alternate embodiment, a method of handling changes in a main database-third-party database system may include receiving changes in the main database. The method may also include determining if those changes came from the third-party database. The method may further include sending changes that did not come from the third-party database to the third-party database. The method also includes the third-party database listening for changes from the main database. The method further includes determining whether to discard the changes listened for. The method also includes integrating the changes into the third-party database. The method may also include use of a particular protocol for communication between the main and third-party databases. The method may also include selective transmission of changes from the main database based on one or more of origin of changes, information (records or objects for example) changed, or other factors.

FIG. 1 illustrates an embodiment of a system. Third-party database 110 is a first database maintained and controlled principally by a first entity, such as databases and surrounding software available from Siebel for example. Main database 150 is a second database having data which may be shared in part with third-party database 110. Interface 130 is an adapter or other interface (software or hardware for example) useful for communication between third-party database 110 and main database 150, and may include a message queue such as an MQ available from IBM Corporation for example.

In one embodiment, changes to data shared between third-party database 110 and main database 150 should be transferred between the databases for coherency purposes. Moreover, in one embodiment, main database 150 may receive changes from a variety of sources. For example, main database 150 may contain financial information which may be accessed and changed by a variety of different entities. Changed data may be represented as a new object 180. Corresponding data from the main database 150 may be represented as a current object 160. Corresponding data from the third-party database 110 may be represented as old object 170.

Figure 2:
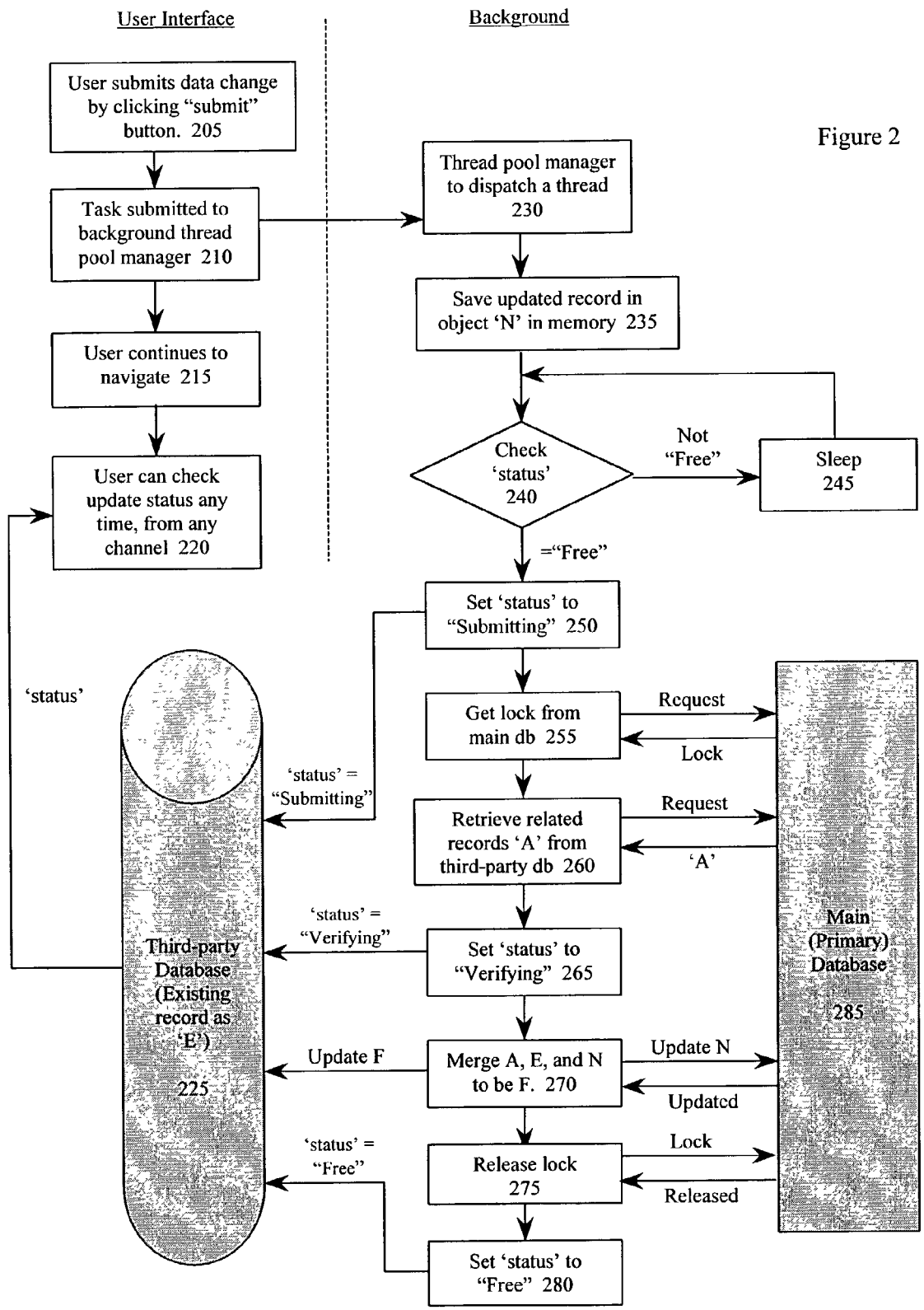
FIG. 2 illustrates an embodiment of a system and a process for operating the system.

FIG. 2 illustrates an embodiment of a system and a process for operating the system. At block 205, a user submits data changes such as by clicking a submit button in a user interface. At block 210, the task of changing the data is submitted as a background thread or process. At block 215, the user continues to navigate or otherwise work with data. At block 220, the user may check the status of the changes submitted at block 205, and may receive status information from the database 225. Such status may indicate the change is being submitted, verified, that the changed record is free, or may otherwise indicate the situation surrounding the record in question.

Meanwhile, at block 230, the thread or process for changing the record in question is dispatched or initiated. At block 235, the updated record is saved to memory as a new object 'N.' At block 240, status of the record ('E') corresponding to the object 'N' in the third-party database or primary database 225 is checked. At block 245, if the record ('E') in database 225 is not available (not 'free'), the process sleeps for a predetermined or undetermined time. If the record ('E') is 'free' then the status of the record is changed to 'submitting' indicating that a change is being submitted and the record is not 'free' for use in other transactions. At block 255, lock is requested and received from main database 285 for the record ('A') corresponding to 'N.' At block 260, 'A' is requested and received from database 285. At block 265, the status of 'E' is set to 'verifying' indicating that the change is now being completed.

At block 270, each of 'A,' 'E,' and 'N' are merged to form 'F' which preferably contains the data from each of 'A,' 'E,' and 'N' using the most up-to-date data available. Likewise, at block 270, 'N' is provided to database 285 to update the contents of 'A' in database 285, and 'F' is provided to database 225 to update what had been 'E' in database 225. At block 275, lock is released in database 285 and the record 'A' as changed is unlocked or released. At block 280, status of 'E' as transformed to 'F' is changed to 'Free' indicating that the change has completed and allowing use of 'F' for further transactions.

Figure 3:
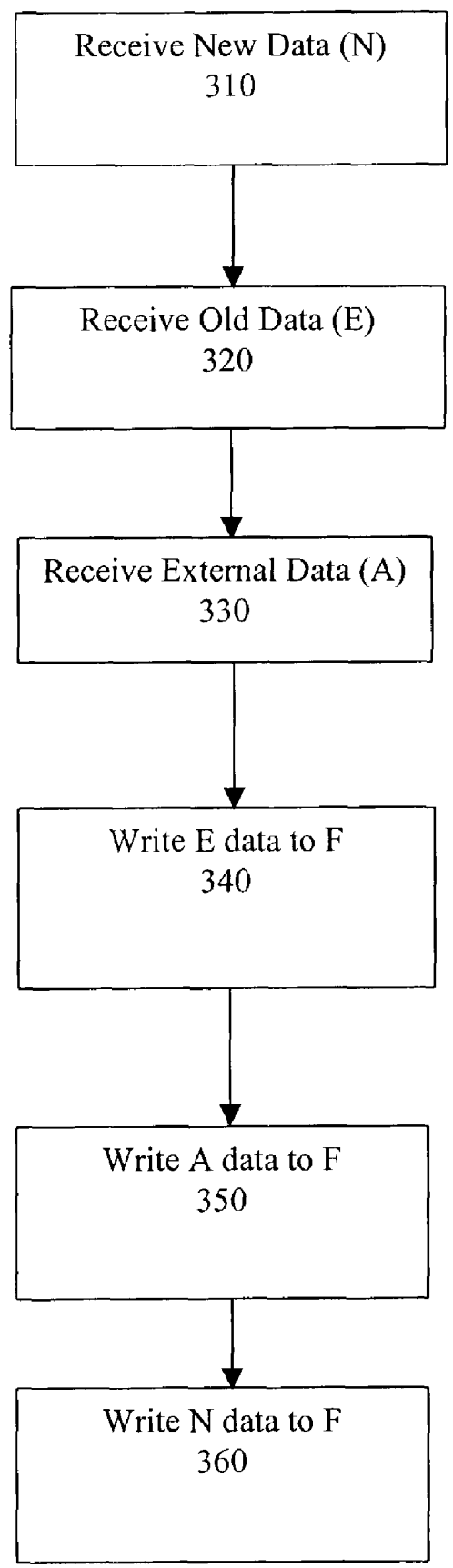
FIG. 3 provides a flow diagram illustrating an embodiment of an alternative process of merging data.

FIG. 3 provides a flow diagram illustrating an embodiment of an alternative process of merging data. At block 310, new data ('N') is received. At block 320, old data ('E') is received from the third-party database. At block 330, external data ('A') is received from the main database. At block 340, 'E' is written to 'F' which will be the final version of the changed data. At block 350, 'A' is written to 'F' and data overlapping between 'E' and 'A' is overwritten by data from 'A.' At block 360, 'N' is written to 'F' and data overlapping between 'N' and either 'E' or 'A' is overwritten by data from 'N.'

Figure 4:
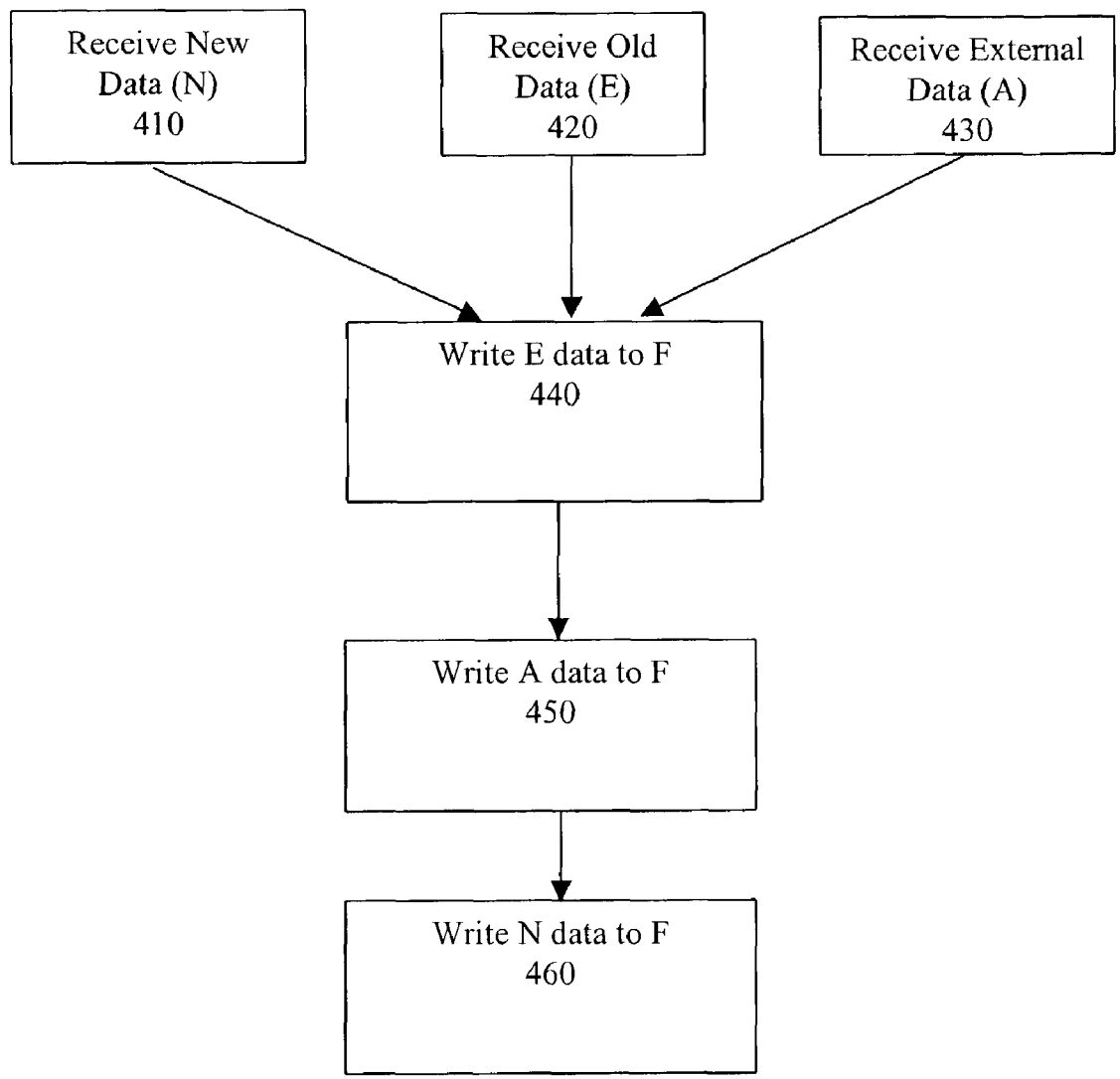
FIG. 4 provides a flow diagram illustrating an embodiment of an alternative process of merging data.

FIG. 4 provides a flow diagram illustrating an embodiment of an alternative process of merging data. At block 410, new data ('N') is received. At block 420, old data ('E') is received from the third-party database. At block 430, external data ('A') is received from the main database. At block 440, 'E' is written to 'F' which will be the final version of the changed data. At block 450, 'A' is written to 'F' and data overlapping between 'E' and 'A' is overwritten by data from 'A.' At block 460, 'N' is written to 'F' and data overlapping between 'N' and either 'E' or 'A' is overwritten by data from 'N.'

Figure 5:
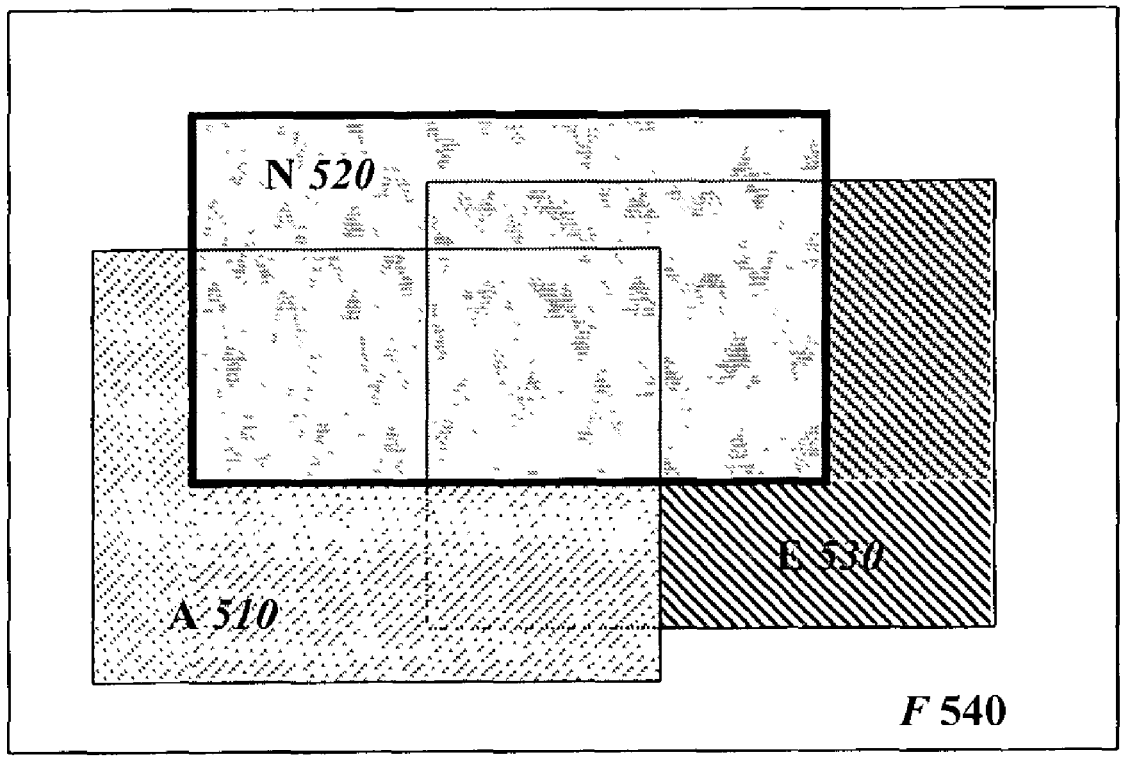
FIG. 5 illustrates an embodiment of various data components or records.

FIG. 5 illustrates an embodiment of various data components or records. A 510 is data from a main database. N 520 is data from a new entry, such as changed data. E 530 is data from a third-party database. Note that the data of A 510 and E 530 correspond to the data of N 520. F 540 represents the resulting data after merging A 510, N 520 and E 530. F 540 may be understood as:

$$F = N | ((\char`\^N) \& A \& E) \; ((\char`\^(N|A)) \& E) | ((\char`\^,(N|E)) \& A) \quad \text{(Equation 1)}$$

Thus, F 540 includes all data from N 520. F 540 also includes data not in N 520 which is in either or both of A 510 or E 530. As illustrated (in FIG. 5 but not in Equation 1), data in A 510 overrides data in E 530. Furthermore, data in N 520 overrides data in either of A 510 or E 530. Note that data is given priority based on its origin, with origin N 520 having highest priority, origin A 510 having intermediate priority and origin E 530 having lowest priority. In one embodiment, this reflects that data from N 520 presumably comes directly from the user, data from A 510 comes from the main database which may be expected to be at least as up-to-date or current as the third-party database, and data from E 530 come from the third-party database.

Figure 6:
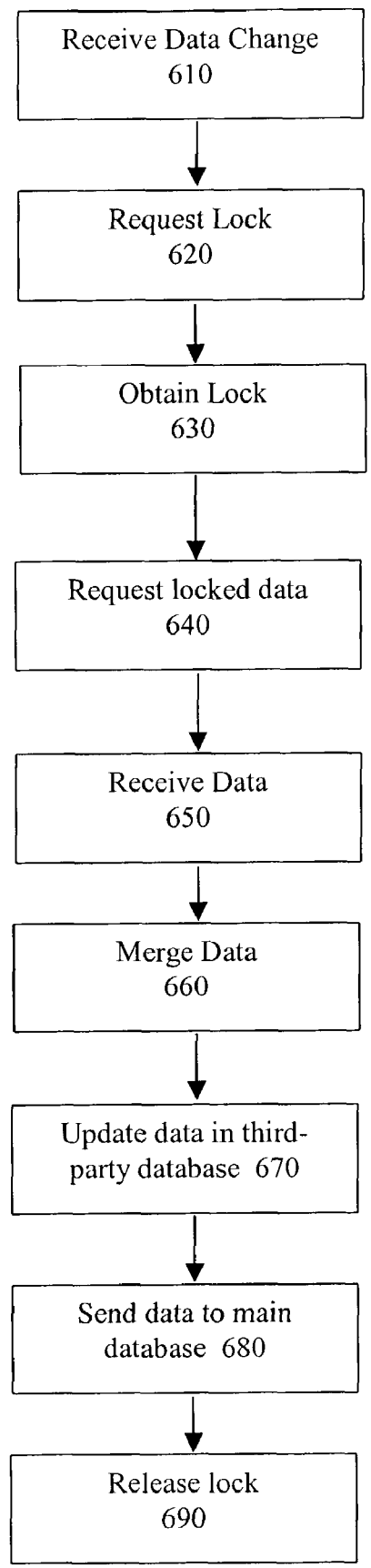
FIG. 6 provides a flow diagram illustrating an embodiment of a process of handling changes in a main database-third-party database system.

FIG. 6 provides a flow diagram illustrating an embodiment of a process of handling changes in a main database-third-party database system. At block 610, a data change is received at a third-party database. At block 620, lock is requested for a record at a corresponding main database. At block 630, lock is received from the main database. At block 640, data of the record is requested from the main database. At block 650, data is received from the main database. At block 660, data from the main database, the third-party database, and the changes received are merged, such as through merging illustrated with respect to FIGS. 3, 4 and 5 for example.

At block 670, the merged data is updated within the third-party database. At block 680, the merged data is sent to the main database for update therein. At block 690, lock within the main database is released, allowing other entities besides the third-party database to write to the record in question. As will be appreciated, similar locks may be necessary in the third-party database, and in one embodiment, lock is released in the third-party database last while in an alternate embodiment lock is released in the third-party database first.

As will be appreciated, it may be necessary to allow for periodic updates of a third-party database from data in a main database. Several alternatives may be contemplated for accomplishing these updates. A pull-based system or method may be used, whereby the third-party database requests the data in question specifically or en masse. An en masse request may prove unwieldy or difficult to control, and specific requests for all data related to a set of records may be similarly unwieldy. However, the pull-based system does not require any significant modifications to most existing databases which would serve as a main database. Thus, for purposes of backward compatibility, the pull-based system may be of value.

Alternatively, a push-based system or method may be used. Such a system may allow for periodic pushing of all data from the main database to the third-party database, with the third-party database parsing the data for useful data. Alternatively, some form of subscription may be introduced, whereby only useful data from the main database is pushed. Furthermore, pushing may be limited to pushing of data when a change occurs, or only pushing changed data when a push is scheduled.

Figure 7A:
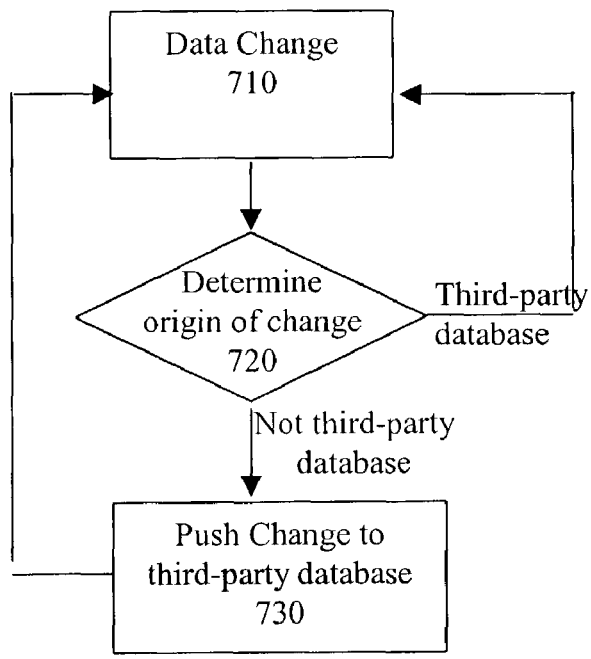
FIG. 7A provides a flow diagram illustrating an alternate embodiment of a process of handling changes in a main database-third-party database system.

FIG. 7A provides a flow diagram illustrating an alternate embodiment of a process of handling changes in a main database-third-party database system. At block 710, data changes in a main database. At block 720, the origin of the change is determined. If the changes originated with the third-party database, the changes are ignored. At block 730, changes not from the third-party database are sent to the third-party database. These changes may be sent as messages in a message queue or other conduit for example, and such messages may be embodied as XML for example. Such XML messages may be expected to follow a format made available in a DTD file for example.

Figure 7B:
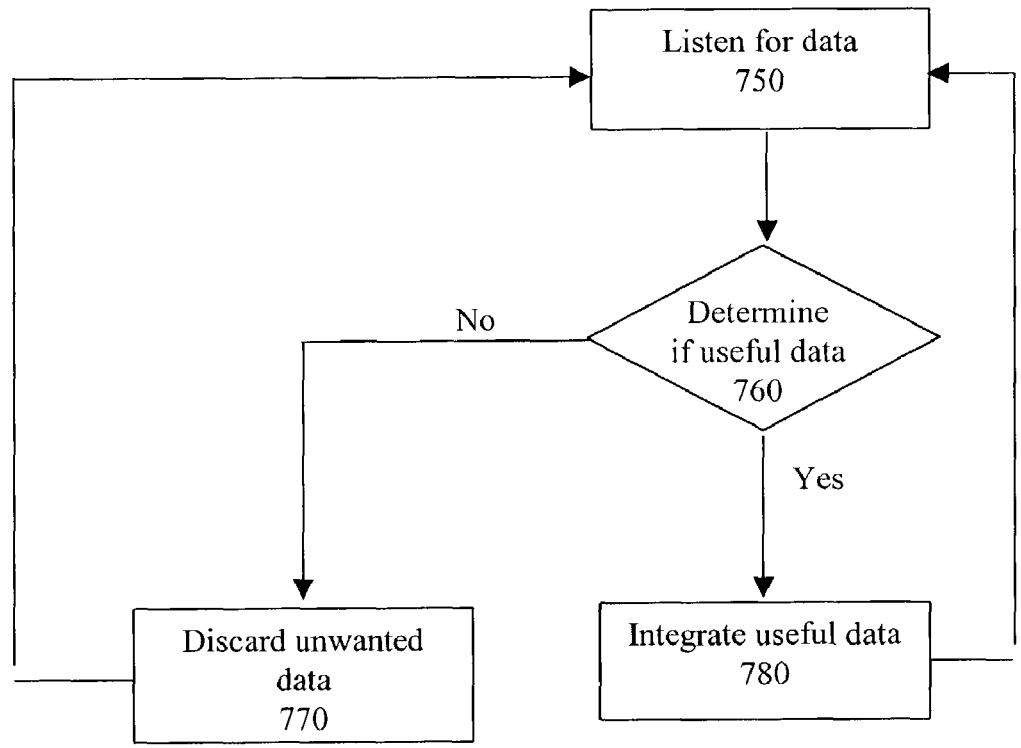
FIG. 7B provides a flow diagram illustrating another alternate embodiment of a process of handling changes in a main database-third-party database system.

FIG. 7B provides a flow diagram illustrating another alternate embodiment of a process of handling changes in a main database-third-party database system. At block 750, a third-party database listens to a message queue or other conduit for changes in a main database. At block 760, data received is examined for usefulness, such as being relevant to data already in the third-party database for example. If the data is not useful, at block 770, the data is discarded. If the data is useful, at block 780, the data is integrated into the third-party database, thereby updating the data therein.

As will be appreciated, data may be received in a variety of forms, and portions of data may be deemed useful. For example, records may be received from a main database which were sent from the third-party database, and thus may be discarded. Similarly, data may be received which includes portions or objects for example which are not useful, but which includes other portions or other objects for example which are useful, and the useful data may be integrated while the rest of the data is discarded. Furthermore, a specification of data to be sent by a main database (such as in a DTD file for example) may be used to ensure that all data, sent has some potential useful property, such as by eliminating from messages all objects of the main database which are not stored within records in the third-party database.

Figure 8:
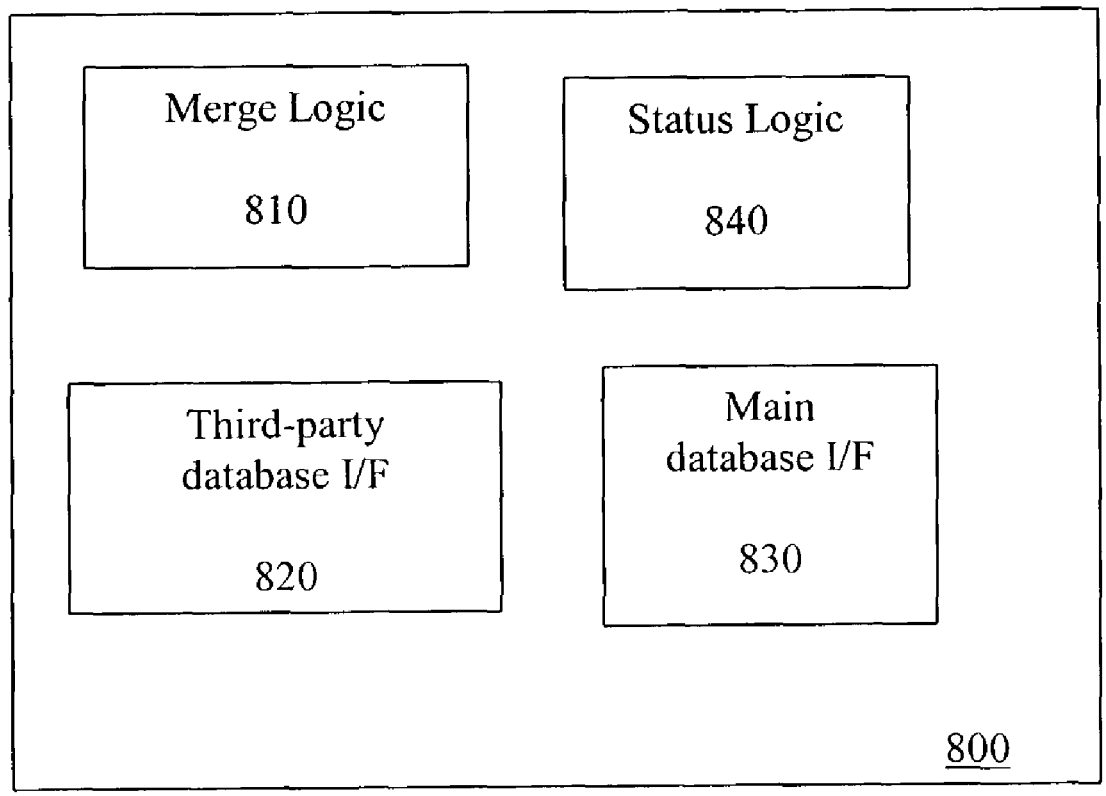
FIG. 8 illustrates a medium or media useful for an embodiment of a process of handling changes in a main database-third-party database system.

FIG. 8 illustrates a medium or media useful for an embodiment of a process of handling changes in a main database-third-party database system. Each of the blocks of medium 800 may be implemented separately or in combination with other blocks and not all blocks need be implemented. Block 810 includes merge logic which may be used to merge a set of corresponding records to produce a final record such as was illustrated with respect to FIGS. 3, 4 and 5 for example. Block 840 includes status logic which may be used to determine the status of a record in a third-party database. Block 820 includes a database interface for use with the third-party database, allowing for querying of the status of records, locking records, requesting records, and inserting, updating, deleting or upserting records. Block 830 includes a database interface for a main database, and may include either an interface for the main database itself or for some form of adapter or front-end useful in accessing the main database. Block 830 may thus allow for querying of the status of records, locking records, requesting records, and inserting, updating, deleting or upserting records in the main database.

Figure 9:
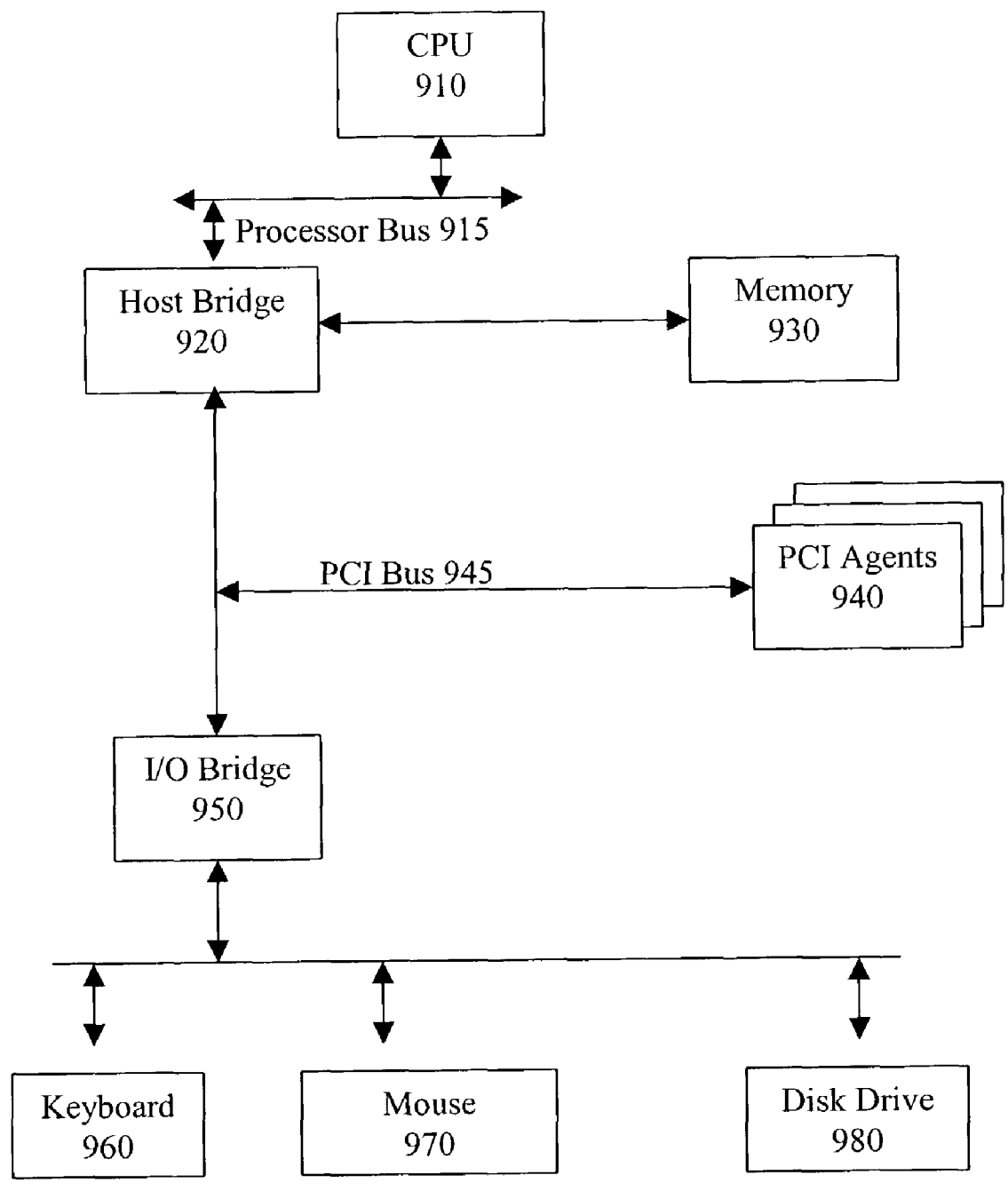
FIG. 9 illustrates an alternate embodiment of a system or machine.

FIG. 9 illustrates an alternate embodiment of a system or machine. Processor 910 is coupled to processor bus 915 and may thereby communicate with host bridge 920 which is also coupled to processor bus 915. Host bridge is coupled to memory 930, to PCI bus 945 and to I/O bridge 950. PCI bus in turn is coupled to PCI agents 940. I/O bridge is coupled to keyboard 960, to mouse 970 and to disk drive 980. As will be appreciated, the blocks of FIG. 9 are illustrative and other components, architectures, organizations, or breakdowns of functionality may be used to implement a system or machine. However, a machine or system as illustrated in FIG. 9 may be used to implement or control processes described herein, and may be an integral part of systems or apparatuses described herein.

Some portions of the detailed description are presented in terms of algorithms and symbolic representations of operations on data bits within a computer memory. These algorithmic descriptions and representations are the means used by those skilled in the art to most effectively convey the substance of their work to others skilled in the art. An algorithm as described here is generally conceived to be a self consistent sequence of acts or operations leading to a desired result. The acts are those requiring physical manipulations of physical quantities. Usually, though not necessarily, these quantities take the form of electrical or magnetic signals capable of being stored, transferred, combined, compared and otherwise manipulated. It has proven convenient at times principally for reasons of common usage to refer to these signals as bits, values, elements, symbols, characters, terms, numbers, data or the like.

It should be borne in mind, however, that all of these in similar terms are to be associated with the appropriate physical quantities and are merely convenient labels applied to these quantities. Unless specifically stated otherwise as apparent from the following discussion it is appreciated that throughout the description discussions utilizing terms such as "processing" or "computing" or "calculating" or "determining" or "displaying" or the like refer to the action and processes of a computer system or similar electronic computing device that manipulates and transforms data represented as physical (electronic) quantities within the computer systems registers and memories into other data similarly represented as physical quantities within the computer system memories or registers or other such information storage transmission or display devices. The present invention can be implemented by an apparatus for performing the operations herein. This apparatus may be specially constructed for the required purposes or it may comprise a machine such as a general purpose computer selectively activated or reconfigured by a computer program (such as a collection of instructions for execution by a machine or processor for example) stored in the computer. Such a computer program may be stored in a computer readable storage medium such as but not limited to any type of disk including floppy disks, optical disks, CD roms and magnetic optical disks, read only memories, random access memories, EPROMS, EEPROMS, magnetic or optical cards or any type of media suitable for storing electronic constructions and each coupled to a computer system bus. Each of these media may be coupled to a computer system bus through use of an appropriate device for reading and or writing the media in question. Specialty apparatus may include a collection of readily available pieces or an application specific integrated circuit including a series of logic blocks for example. The blocks of FIGS. 3, 4, 6, 7A, 7B or 8 may be suitable for implementation as logic blocks, as may other configurations of the method, system and apparatus described herein.

The algorithms and displays presented herein are not inherently related to any particular computer or other apparatus. Various general purpose systems may be used with programs in accordance with the teachings herein or it may prove convenient to construct more specialized apparatus to perform the required method. For example, any of the methods according to the present invention can be implemented in hard wired circuitry by programming a general purpose processor or by any combination of hardware and software. One of skill in the art will immediately appreciate that the invention can be practiced with computer system configuration. Configurations other than those described below including hand held devices, multi processor systems, microprocessor based or programmable consumer electronics, network PCs, mini computers, main frame computers and the like. The invention may also be practiced in distributed computing environments or tasks or performed by remote processing devices that are linked through a communications network. The required structure for a variety of these systems will appear from the description below.

The methods of the invention may be implemented using computer software. If written in a programming language conforming to a recognized standard sequences of instructions designed to implement the methods can be compiled for execution on a variety of hardware platforms or machines and for interface to a variety of operating systems. In addition the present invention is not described with reference to any particular programming language. It will be appreciated that a variety of programming languages may be used to implement the teachings of invention as described herein. Furthermore, it is common in the art to speak of software in one form or another (for example program procedure application etc . . . ) as taken in action or causing a result. Such expressions are merely a shorthand way of saying that execution of the software by a computer causes the processor of the computer to perform an action or produce a result.

In the foregoing detailed description, the method and apparatus of the present invention has been described with reference to specific exemplary embodiments thereof. It will, however, be evident that various modifications and changes may be made thereto without departing from the broader spirit and scope of the present invention. In particular, the separate blocks of the various block diagrams represent functional blocks of methods or apparatuses and are not necessarily indicative of physical or logical separations or of an order of operation inherent in the spirit and scope of the present invention. For example, the various blocks of FIGS. 8 or 9 may be integrated into components, or may be subdivided into components. Similarly, the blocks of FIGS. 4 or 5 (for example) represent portions of a method which, in some embodiments, may be reordered or may be organized in parallel rather than in a linear or step-wise fashion. The present specification and figures are accordingly to be regarded as illustrative rather than restrictive.

What is claimed is:

1. A method of changing information in a first database and a second database, comprising:

receiving an update record N comprising new information to update a first record A in the first database and a second record E in the second database, wherein the first record A and the second record E correspond to the new information; and merging the update record N, the first record A, and the second record E into a final record F so that F=N|((^N)&A&E)|((^(N|A))&E)|((^(N|E))&A).

2. The method of claim 1 further comprising:
requesting the first record A from the first database.

3. The method of claim 2 further comprising:
requesting the second record E from the second database.

4. The method of claim 3 further comprising:
updating the first record A in the first database using the contents of the final record F.

5. The method of claim 4 further comprising:
updating the second record E in the second database using the contents of the final record F.

6. The method of claim 5 further comprising:
locking the first record A of the first database; and
unlocking the first record A of the first database.

7. The method of claim 6 further comprising:
verifying the changes to the second record E in the second database.

8. The method of claim 2 further comprising:
submitting the new information to the second database.

9. The method of claim 7 wherein:
receiving the new information includes receiving the new information responsive to a submission by a user.

10. The method of claim 2 further comprising:
checking status of the second database for free status.

11. The method of claim 10 further comprising:
awaiting free status of the second database.

12. An apparatus for updating a first database and a second database comprising:

a processor to perform:

means for receiving an update record N comprising new information to update a first record A in the first database and a second record E in the second database, wherein the first record A and the second record E correspond to the new information; and means for merging the update record N, the first record A, and the second record E into a final record F so that F=N|((^N)&A&E)|((^(N|A))&E)|((^(N|E))&A), wherein the means for merging coupled to the means for receiving.

13. The apparatus of claim 12 further comprising:

means for updating, the means for updating for updating the first record A in the first database using the contents of the final record F, and for updating the second record E in the second database using the contents of the final record F, the means for updating coupled to the means for merging.

14. The apparatus of claim 13 further comprising:

means for locking, the means for locking for locking and unlocking the first record A of the first database, the means for locking coupled to the means for receiving and the means for updating.

15. The apparatus of claim 14 further comprising:

means for verifying the changes to the second record in the second database.

16. A machine-readable medium embodying instructions executed by a processor, cause the processor to perform a method of changing information in a first database and a second database, the method comprising:

receiving an update record N comprising new information to update a first record A in the first database and a second record E in the second database, wherein the first record A and the second record E correspond to the new information; and merging the update record N, the first record A, and the second record E into a final record F so that $F=NI((^\wedge N)\&A\&E)I((^\wedge(NIA))\&E)I((^\wedge(NIE))\&A)$.

17. The machine-readable medium of claim 16 further embodying instructions executed by the processor, to further cause the processor to perform the method further comprising:
   requesting the first record A from the first database; and requesting the second record E from the second database.

18. The machine-readable medium of claim 17 further embodying instructions executed by the processor, to further cause the processor to perform the method further comprising:
   updating the first record A in the first database using the contents of the final record F.

19. The machine-readable medium of claim 18 further embodying instructions executed by the processor, to further cause the processor to perform the method further comprising:
   updating the second record E in the second database using the contents of the final record F.

20. The machine-readable medium of claim 18 further embodying instructions executed by the processor, to further cause the processor to perform the method further comprising:
   submitting the new information to the second database.

21. The machine-readable medium of claim 19 further embodying instructions executed by the processor, to further cause the processor to perform the method further comprising:
   locking the first record A of the first database; and
   unlocking the first record A of the first database.

22. The machine-readable medium of claim 21 further embodying instructions executed by the processor, to further cause the processor to perform the method further comprising:
   verifying the changes to the second record in the second database.

23. The machine-readable medium of claim 22 further embodying instructions executed by the processor, to further cause the processor to perform the method wherein:
   receiving the new information includes receiving the new information responsive to a submission by a user.

24. The machine-readable medium of claim 23 further embodying instructions executed by the processor, to further cause the processor to perform the method further comprising:
   receiving a status request from the user; and providing status information responsive to the status request from the user.

25. The machine-readable medium of claim 24 further embodying instructions executed by the processor, to further cause the processor to perform the method further comprising:
   checking status of the second database for free status; and awaiting free status of the second database.

* * * * *

UNITED STATES PATENT AND TRADEMARK OFFICE
CERTIFICATE OF CORRECTION

PATENT NO. : 7,774,307 B2
APPLICATION NO. : 10/206263
DATED : August 10, 2010
INVENTOR(S) : Wade Ju et al.

It is certified that error appears in the above-identified patent and that said Letters Patent is hereby corrected as shown below:

In column 4, line 26, Delete " $((\hat{\ },(N|E)) \& A)$ " and insert -- $((\hat{\ }(N|E)) \& A)$ --, therefor.

In column 7, line 1, Delete "may" and insert -- many --, therefor.

In column 8, line 40, In Claim 12, delete " $F=N|((^\wedge N)\&A\&E)|((^\wedge(N|A))\&E)|((^\wedge(N|E))\&A)$, " and insert -- $F=N|((^\wedge N)\&A\&E)|((^\wedge(N|A))\&E)|((^\wedge(N|E))\&A)$, --, therefor.

In column 8, line 44, In Claim 13, after "for updating" delete "for updating".

In column 8, line 52, In Claim 14, after "for locking" delete "for locking".

In column 8, line 60, In Claim 16, after "processor," insert -- to --.

In column 8, line 2-3, In Claim 16, delete " $F=N|((^\wedge N)\&A\&E)|((^\wedge(N|A))\&E)|((^\wedge(N|E))\&A)$, " and insert -- $F=N|((^\wedge N)\&A\&E)|((^\wedge(N|A))\&E)|((^\wedge(N|E))\&A)$, --, therefor.

Signed and Sealed this
Tenth Day of May, 2011

David J. Kappos
*Director of the United States Patent and Trademark Office*